United States Patent

[11] 3,603,804

| [72] | Inventor | Jesse Marion Casey |
| | | Scottsboro, Ala. |
| [21] | Appl. No. | 11,522 |
| [22] | Filed | Feb. 16, 1970 |
| [45] | Patented | Sept. 7, 1971 |
| [73] | Assignees | Dr. A. Carl Collins; |
| | | Dawson, McGinty and Livingston |
| | | Scottsboro, Ala., part interest to each |

[54] WAVE OPERATED POWER APPARATUS
7 Claims, 3 Drawing Figs.

[52] U.S. Cl. .................................................. 290/42,
290/53, 417/61, 417/332, 417/521
[51] Int. Cl. ...................................................... F03b 13/12
[50] Field of Search ........................................... 290/42, 43,
53, 54; 417/61, 100, 330, 331, 332, 333, 334, 337,
523, 521

[56] References Cited
UNITED STATES PATENTS
| 616,467 | 12/1898 | Jones ............................ | 417/332 X |
| 855,258 | 5/1907 | Neal ............................ | 417/332 |
| 1,018,678 | 2/1912 | Nelson ........................ | 290/53 |
| 1,604,632 | 10/1926 | Carter .......................... | 417/330 |
| 1,796,618 | 3/1931 | Petersen ...................... | 417/330 |
| 3,353,787 | 11/1967 | Semo ........................... | 417/330 |
| 3,274,941 | 9/1966 | Parr ............................. | 417/331 |

*Primary Examiner*—G. R. Simmons
*Attorney*—Bacon & Thomas

ABSTRACT: An elongated U-shaped pipeline has floats pivoted on transverse axes for rocking thereon in response to wave action in water which the floats are buoyant. Rocking of the floats operates pumps arranged in pressure compounding relation and the fluid under pressure is delivered to a shore-based storage tank. The storage tank being sealed allows build up of a pressure head. The fluid is let out through a regulator to operate machinery. Spent fluid from the plant is spilled out into a recovery tank, directly under the motor or turbine. It is then picked up by the lower leg of the pipeline and returned to repeat its cycle again. The floats support the pipeline and can be flooded to sink below the surface to avoid damage by storm waves.

INVENTOR
JESSE MARION CASEY
BY Bacon & Thomas ATTORNEYS

PATENTED SEP 7 1971
3,603,804
SHEET 2 OF 2
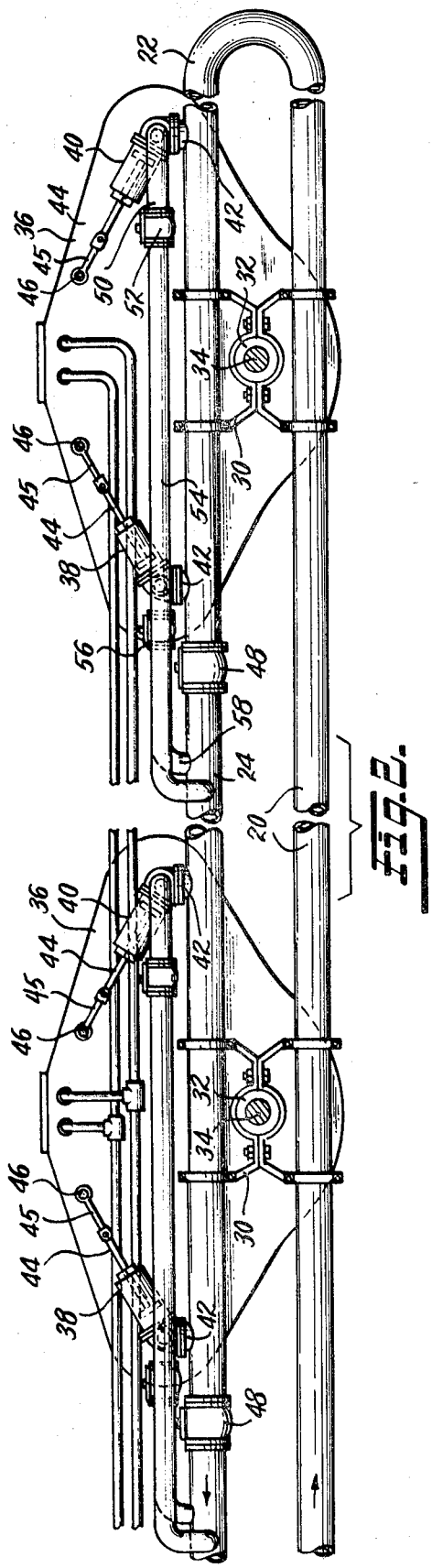
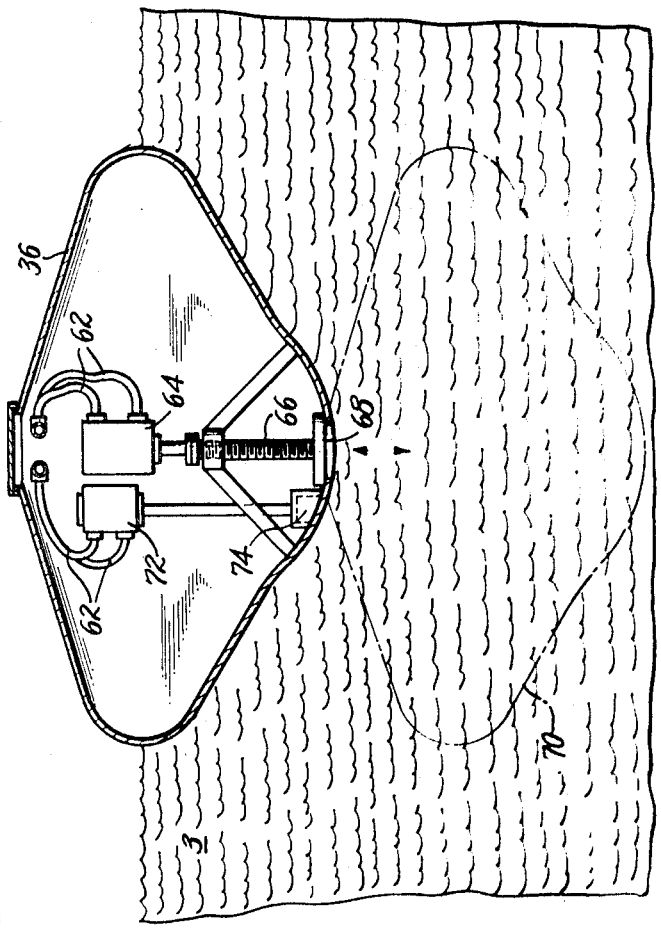
INVENTOR
JESSE MARION CASEY
BY
Bacon & Thomas
ATTORNEYS

WAVE OPERATED POWER APPARATUS

BACKGROUND OF THE INVENTION

This invention relates to apparatus for deriving power from wave motion on a body of water.

Many proposals have been made heretofore for utilizing the energy of ocean waves to generate power but none have heretofore proven successful or practical. One reason for this lack of success has been the fact that occasional storms destroy the apparatus. Another is that they were not able to build a large quantity of pressure by compounding pressure from one float to another.

SUMMARY OF THE INVENTION

The invention comprises generally horizontally extended floats pivotally supported on a pipe system extending outwardly from the shore. The floats are supported on the pipe system on transverse axes so as to rock in response to wave action and at the same time support the pipe system for rising and falling with changes in water level. The pipe system is articulated near a shore-based installation so that it can rise and fall pivotally. The pipe system comprises a U-shaped pipe with its return bends at the outer end. Rocking motion of the floats is translated into pumping action of a series of pumps arranged to pump fluids or air in the upper leg of the pipe system and deliver it to the shore-based installation for operation of suitable motors or turbines. Spent fluid is returned from a recovery tank through the other leg of the pipe system for reuse. Each of the pumps is arranged to successively compound the pressure delivered by the previous pump.

Means are provided for sinking or partially sinking the floats so as to ride below the surface of the water in case of a storm or tidal wave. These means are selectively controlled so as to sink the float below the danger level of a storm and to a level where they can still respond to wave action to continue operation while submerged.

BRIEF DESCRIPTION OF THE DRAWINGS

FIG 2 is a vertical sectional view taken substantially along the line 2—2 of FIG. 1; and FIG. 3 is a vertical sectional view taken through one of the floats of the apparatus.

DESCRIPTION OF A PREFERRED EMBODIMENT

Figure 1:
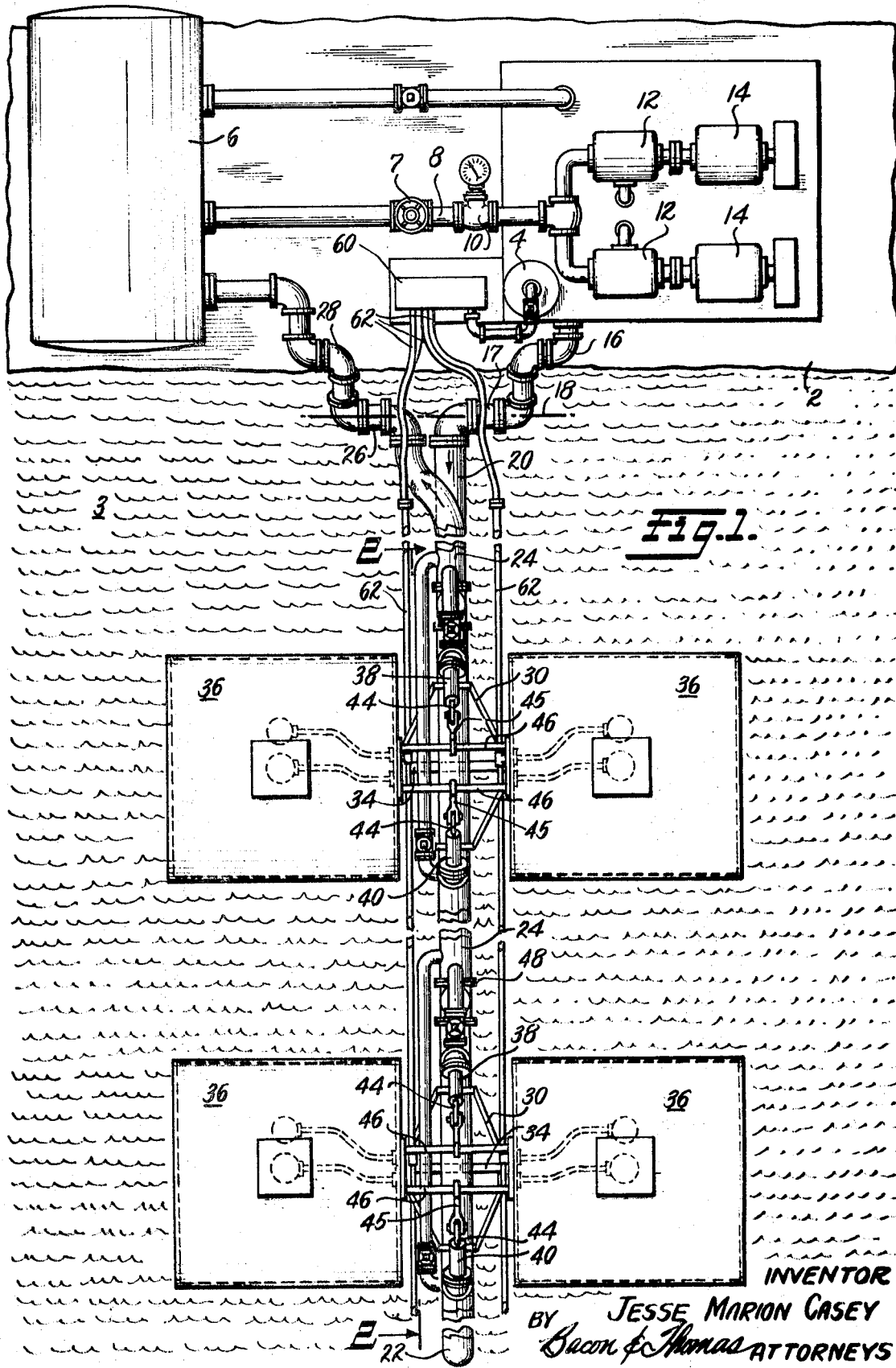
FIG. 1 is a plan view, broken away, of an installation according to the present invention.

IN FIG. 1, numeral 2 represents the shore along a body of water 3, for example, an ocean shore. While the description will proceed with reference to the "shore," it is to be understood that the stationary portion of the apparatus could be constructed on any desired stationary base, such as a pier, artificial island or the like.

The fixed shore-based installation is shown as including a compressed air supply 4 and a storage or accumulator tank 6 for fluid under pressure. From the storage tank 6 fluid under pressure is delivered through a valve 7, a pipe 8 and pressure regulator 10 to suitable motors or turbines 12 arranged to drive generators 14 or any suitable machinery. For example, the motors 12 are driven by the pressurized fluid passing through the regulator 10. Spent fluid from the motors falls into a recovery tank and is picked up for recycle by the lower pipe or return line 16. The pipe arrangement 16 includes means defining first gland structure 17 having a generally horizontal pivot 18 about which the outer portions of the pipe can pivot. The spent fluid is then directed along the lower leg 20 of a generally U-shaped pipe assembly having a reverse bend 22 at its outer end and the main pressure pipe 24 extending parallel to the pipe 20 and having a second gland structure 26 at its inner end for pivotal movement about the axis 18. From the gland 26, pressurized fluid is delivered through fittings 28 to The pipes 20 and 24 are arranged, preferably one below the other as shown in FIG. 2 and are held in fixed relative position by suitable clamping bracket assemblies 30. Each of the bracket assemblies 30 also support a bushing 32 in which a transverse shaft 34 is journaled. The shafts 34 extend laterally outwardly of both sides of the pipe assembly and each is provided with a hollow float 36 affixed to its outer end. Thus the two floats of each shaft are mounted for pivotal oscillation about the axis of shaft 32 in unison and as a unit. The floats 36 are preferably of the general shape indicated in FIGS. 2 and 3 so that when they float on the water or a selected distance below the surface thereof, they will respond to wave action by oscillating about the axis of their respective shafts 34.

To each pair of floats 36 there is connected a pair of reciprocating pumps 38 and 40, the pumps 38 being nearest the shore and the pumps 40 being outermost. Each of the pumps comprises a cylinder mounted on the pipe 24, which mounting 42 also defines an inlet to the pump from the pipe 24 and includes a suitable inlet check valve (not shown). Each of the pumps 40 is likewise mounted on the pipe 24 by a fitting 42 providing a communication with the pipe 24 as an inlet (with check valve) for the pumps 40.

Each pump is provided with a suitable piston and piston rod 44 connected through a pivoted connecting rod 45, to transverse rods 46 extending between the floats 36 near the tops thereof. Thus, when a float rocks about the axis of its shaft 34, the pumps 38 and 40 will be alternately actuated in pumping and intake strokes, as will be apparent to those skilled in the art.

In FIG. 2, the right-hand float and pump assembly will be assumed to be the outermost pair of floats on the entire pipe assembly. Thus, spent fluid from the power plant flows to the right in pipe 20, around return bend 22 and into pipe 24. It can then flow into the intake of either pump 38 or 40 of the outermost pair of pumps or through a large check valve 48 in pipe 24. It will take the line of least resistance. The outlet from the outermost pump 40 delivers pressurized fluid to a pipe 50, through a check valve 52 and along pipe 54 into the pie 24 at the left side of the check valve 48. In like manner the outlet of pump 38 is delivered through check valve 56 and pipe 58 into pipe 24 to the left of the check valve 48 therein. Thus, the portion of pipe 24 to the left of check valve 48 becomes an inlet manifold for the next succeeding pair of pumps 38 and 40, which compound the pressure delivered from the first pair of pumps.

It is to be understood that any number of float and pump pairs may be positioned between the two pairs shown in FIG. 2 so that the pressure of the pumped fluid can be compounded to any desired ultimate pressure. The same arrangement of check valve 48 and delivery pipes and check valves from each pair of pumps, as shown in FIG. 2 is contemplated. The innermost pair of pumps, however, deliver their pressurized fluid directly into the innermost portion of the pipe 24 for flow directly into the storage or accumulator tank 6.

FIG. 3 is a schematic sectional view through any one of the floats 36, showing its hollow construction and illustrating depth control means therein. As shown in FIG. 1, a suitable control panel 60 serves to control flow of compressed air from the air supply 4 along selected ones of a plurality of air hoses 62 outwardly along the assembly of pipes to the respective floats thereon. It is to be understood that an operator at the control panel 60 may selectively actuate suitable controls to direct air or other fluid under pressure selectively along the conduits 62 into each of the floats as indicated in FIG. 3. One pair of conduits 62 controls an air-driven motor 64 to rotate a screw 66 in either selected direction to open or close a buoyancy control valve 68. When the motor 64 is operated in a direction to open the valve 68, sea water is permitted to enter the interior of the float to flood the same to whatever degree is desired, after which the valve 68 may be closed. With all of the floats 36 flooded to a predetermined degree, the entire assembly will sink to a lower level, such as shown at destructive surfaces waves in the event of a storm. However, even at the lower level 70, the floats will respond to wave action, which is known to extend a considerable distance below the water surface, to continue to operate their respective pumps and to deliver pressurized fluid to the shore installation. Obviously, in the event of an extremely severe storm, the floats can be completely flooded so the assembly can sink to and rest safely on the bottom.

A second air-driven motor 72, likewise selectively controlled by the operator at control panel 60, is operable to actuate a "bilge" pump 74. When it is desired to lift the floats back to the surface of the water, the motor 72 is operated to pump the flooding water from the interior of the float and some of the air used to operate the motor 72 is exhausted to the interior of the float to replace the discharge water and thus increase the buoyancy of the floats and return the assembly to the water surface.

While a single specific embodiment of the invention has been shown and described herein, the same is merely illustrative of the principles involved and other embodiments may be resorted to.

I claim:

1. A wave operated power apparatus on a fixed base adjacent a body of water comprising:

pipe means extending outwardly from said base and adjacent the surface of said body of water;

a plurality of support means arranged serially on said pipe means defining generally horizontal axes transverse to said pipe means;

float means journaled on each of said support means, about said axes, and arranged to float on said body of water to buoyantly support said pipe means and to oscillate about said axes in response to waves in said body of water;

separate pump means connected between said float means and said pipe means and responsive to oscillatory movement of said float means about said axes for compressing fluid and delivering compressed fluid to the inlet of an adjacent pump and finally to said pipe means whereby said pump means serially compound the pressure in said fluid; and motor means on said base, connected to said pipe means, for using said compoundly compressed fluid to generate power.

2. Apparatus as defined in claim 1 wherein said pipe means is connected to said base by means of an articulated connection whereby said pipe means and float means may rise and fall in response to changes in water level.

3. Apparatus as defined in claim 1 wherein each said float means comprises a transverse shaft journaled on its support means and hollow float bodies fixed to respectively opposite ends of said shaft on opposite sides of said pipe means, said shafts being drivingly connected to said pump means.

4. Apparatus as defined in claim 1 wherein said pipe means comprises a pair of parallel pipes, said support means being secured to both pipes to hold the same fixed relative to each other;

said pipes being connected at their outer ends to define a single fluid conduit;

the inner end of one of said pipes being connected to deliver fluid under pressure to said motor means and the other being connected to said motor means to receive spent exhaust fluid therefrom; and check valve means in said fluid conduit arranged to confine fluid under pressure to said one pipe.

5. Apparatus as defined in claim 4 including a storage tank on said base for accumulating fluid under pressure from said one pipe; and conduit means for directing fluid from said storage tank to said motor means.

6. Apparatus as defined in claim 1 wherein each pump means has an inlet and an outlet, the outlets of all but the innermost of said pump means being connected to the inlet of the next innermost pump means whereby the pressure of said fluid is compounded by successive pump means.

7. Apparatus as defined in claim 2 wherein said float means comprises hollow bodies, buoyancy control means in said hollow bodies for flooding the interiors thereof with ambient water and for evacuating water therefrom; and selectively operable means on said base for controlling operation of said buoyancy control means for selectively flooding and evacuating said hollow bodies whereby they may be caused to float at a desired level relative to the surface of said body of water.